Patented Oct. 10, 1922.

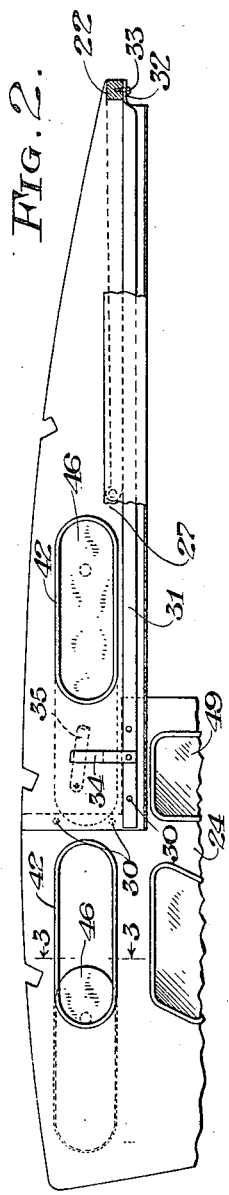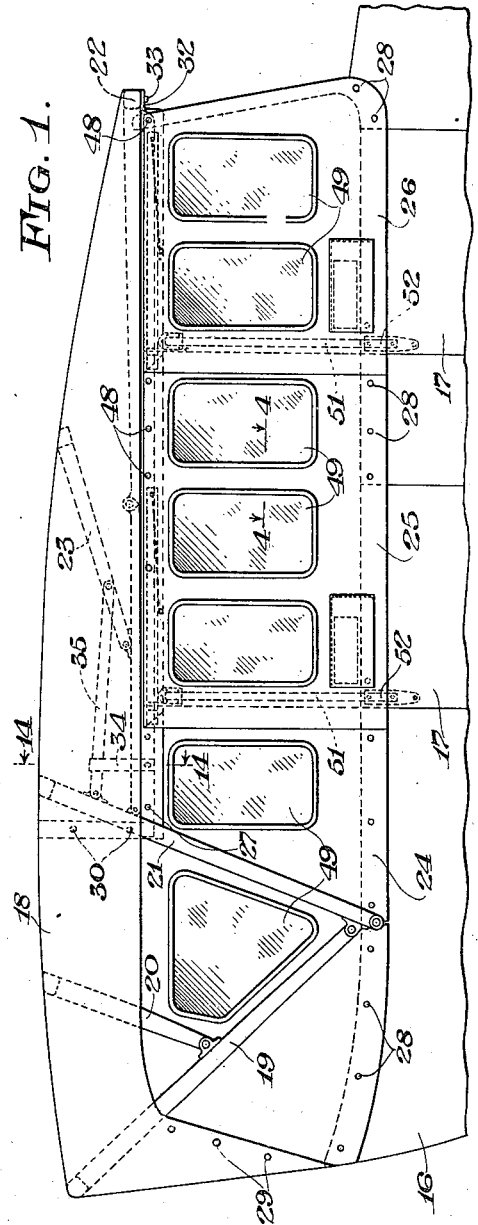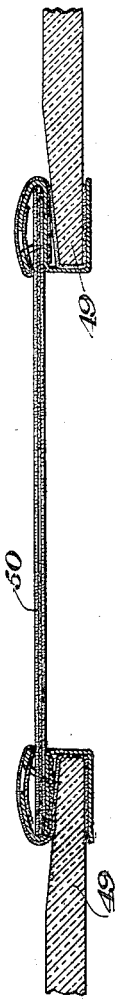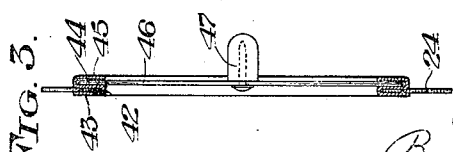

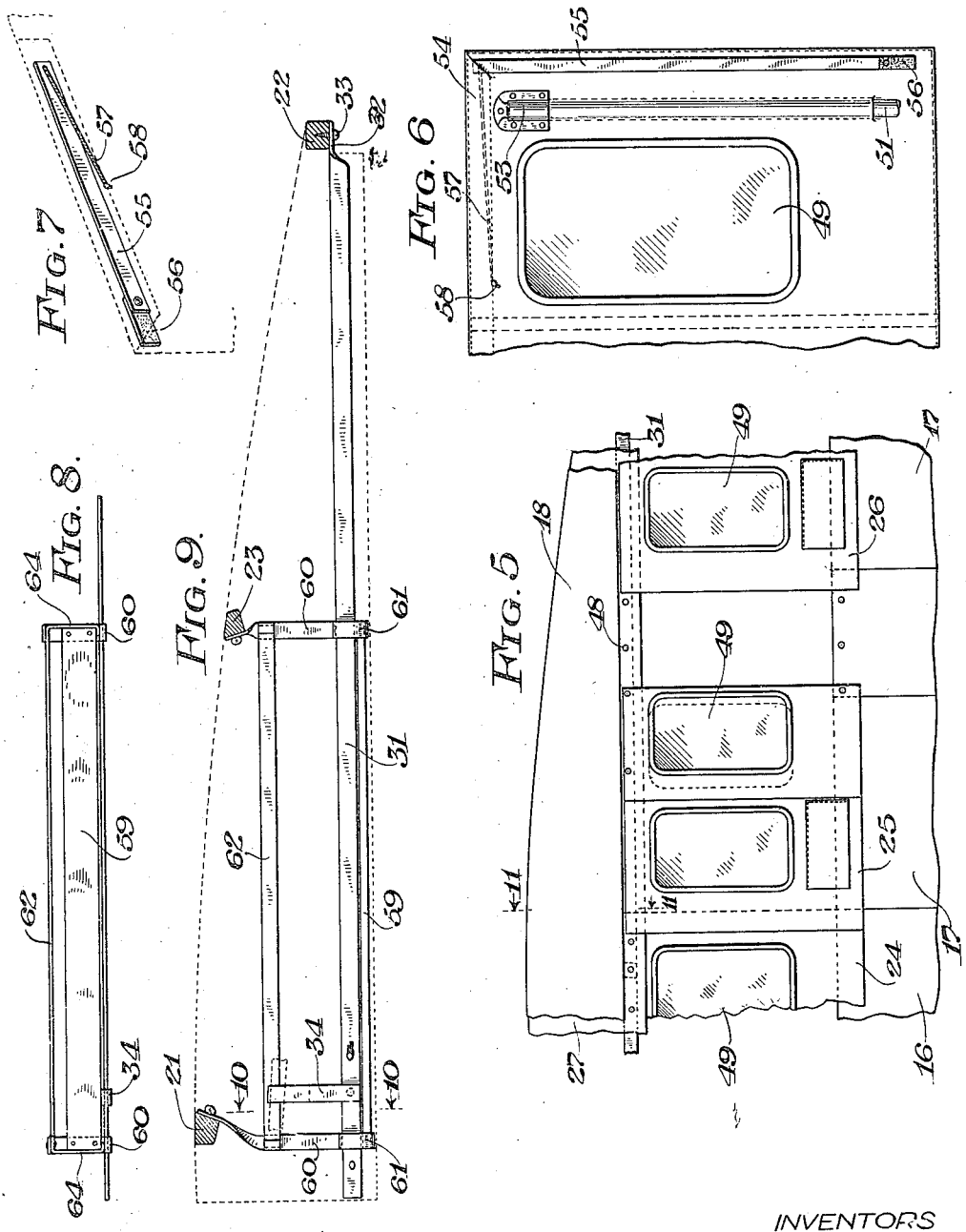

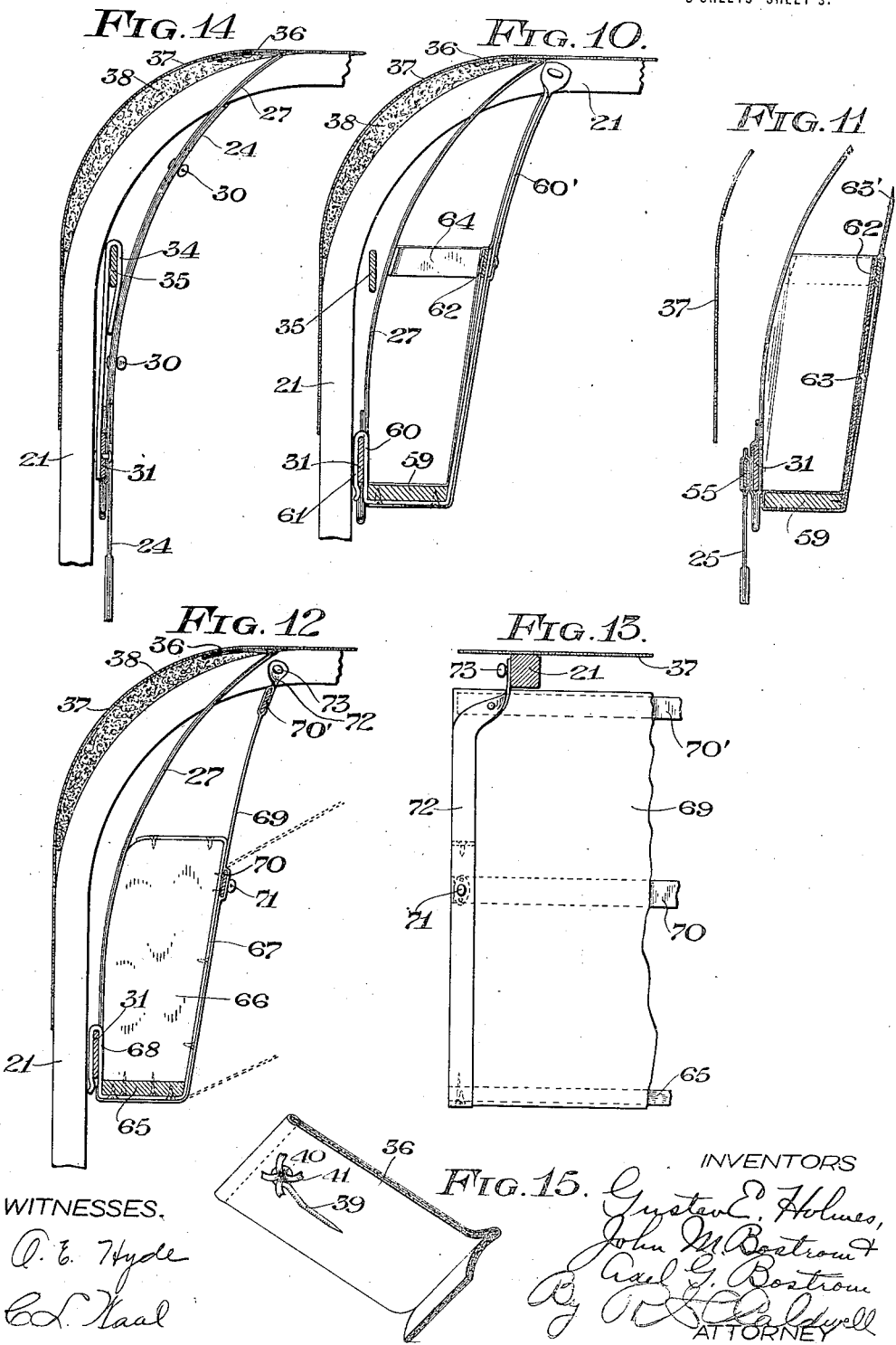

1,431,230

UNITED STATES PATENT OFFICE.

GUSTAV E. HOLMES, JOHN M. BOSTROM, AND AXEL G. BOSTROM, OF MILWAUKEE, WISCONSIN.

AUTOMOBILE INCLOSURE.

Application filed May 10, 1920. Serial No. 380,403.

*To all whom it may concern:*

Be it known that we, GUSTAV E. HOLMES, JOHN M. BOSTROM, and AXEL G. BOSTROM, citizens of the United States, and residents of Milwaukee, county of Milwaukee, and State of Wisconsin, have invented new and useful Improvements in Automobile Inclosures, of which the following is a description, reference being had to the accompanying drawings, which are a part of this specification.

This invention relates to automobile inclosures for covering the space between the folding top and body of an automobile so that the interior is entirely closed to protect the occupants from the weather.

One of the objects of this invention is to provide an inclosure in which the side curtains containing glass windows may be taken down and compactly folded into a small space.

A further object of this invention is to provide a receptacle secured to the top of the vehicle for carrying the side curtains when they are not in use.

A further object of the invention is to provide a means for ventilating the inclosure.

A further object of the invention is to provide a simple and effective means for securing the curtains to the top.

The invention further consists in the several features hereinafter set forth and more particularly defined by claims at the conclusion hereof.

In the drawings: Fig. 1 is a side view of a portion of an automobile showing a form of inclosure embodying the invention; Fig. 2 is a detail view of the curtain supporting means and the ventilator; Fig. 3 is a section taken on the line 3—3 of Fig. 2; Fig. 4 is a section taken on the line 4—4 of Fig. 1; Fig. 5 is a detail view of the side curtains; Fig. 6 is a detail view from the inner side of the curtain showing the reinforcing means, the top bar being shown in position for folding the curtain; Fig. 7 is a detail view of the reinforcing top bar in operative position; Fig. 8 is a plan view of the curtain receptacle; Fig. 9 is a side view of the curtain receptacle; Fig. 10 is a section through the top taken on the line 10—10 of Fig. 9, the lower side curtain not being shown; Fig. 11 is a section taken on the line 11—11 of Fig. 5; Fig. 12 is a section similar to Fig. 10 showing a modified form of curtain receptacle; Fig. 13 is a detail side view of the receptacle shown in Fig. 12; Fig. 14 is a section taken on the line 14—14 of Fig. 1, the curtain receptacle being omitted; Fig. 15 is a detail view of the top side curtain showing the means for securing it to the vehicle top.

Referring to the construction shown in Figs. 1, 2, 4, 5, 6 and 14, the numeral 16 indicates an automobile body having the usual side doors 17 and the flexible folding top 18 carried by the bows 19, 20, 21, 22 and 23.

To inclose the space between the top and sides of the automobile side curtains 24, 25, 26 and 27 are provided on each side. The curtains 24, 25 and 26 are secured to the sides of the automobile by fasteners 28. Each rear curtain 24 is entirely stationary and is attached to the back portion of the top by fasteners 29 and these curtains extend up beneath the top and are secured to the top padding in a manner hereinafter described.

The front edge of the curtain 24 is secured to the curtain 27 by fasteners 30, Fig. 2.

The curtain 27 extends from overlapping position with the front edge of the rear curtain to the front end of the bow 22 and carries a metal bar 31 which is encased in the lower edge of this curtain. The bar 31 is disposed edgewise in the curtain and its front end 32 is twisted at right angles to the plane of the bar so that it lies flat against the end portion of the bow to which it is detachably connected by screws 33. A hook member 34 is secured to the rear portion of the bar 31 and engages one of the bow links 35 of the folding top. In this way the bar 31 is firmly held in place and serves to reinforce the lower edge of the curtain 27 throughout its length so that the curtains 25 and 26 may be hung therefrom. At the upper edges of the curtains 24 and 27 flaps 36, suitably stiffened, are provided, Fig. 15, which flaps fit in between the top covering 37 and the padding 38 and at intervals are provided with pins 39 having eyed ends 40 which are secured to the flaps by rivets 41. These rivets are here shown as provided with a split tubular shank and the split portions are crimped over the end 40 of the pin 39 to clamp it to the flap. The pins are in the under side of the flap and are pinned into the padding 38, as shown in Fig. 14, so that the upper edges of the curtains 24 and 27 are securely held in place.

In the curtains 24 and 27 we have shown ventilators, Figs. 2 and 3. Each ventilator consists of a sheet metal frame 42 having the edges of the curtain at the opening secured between an outer flange 43 and its central portion 44, and having a flange 45 cooperating with the portion 44 to form guideways for a shutter 46 having a handle 47 which may be manipulated from within the car, the handle forming a stop to limit the movement of the shutter.

The curtains 25 and 26 are secured to the lower edge of the curtain 27 by fasteners 48, and these curtains and the rear curtains 24 are provided with windows 49 as large as practicable so as to furnish as much light as possible to the interior of the vehicle.

These curtains 25 and 26 are designed to be folded up into widths slightly greater than the width of each window and for this purpose the stiffening fabric 50 is omitted from the central portion of the curtain between the windows as shown in Fig. 4.

The curtains 25 and 26 each have a vertically disposed rod 51 embedded therein and secured at its lower end to a socket 52 on the inside of the door 17 and at its upper end in a metal socket 53 riveted to the curtain.

To reinforce the door portions of the curtains 25 and 26 the upper portion of each of these curtains is provided with a pocket 54 to receive a metal rod or bar 55 having a piece of leather 56 on its end. To permit folding up of these curtains this bar has a sliding fit in the pocket 54 so that it may be removed therefrom and swung down into the position shown in Figs. 6 and 7, it being held to the curtain by means of a cord 57 secured at one end 58 to the curtain and passing through a portion of the pocket and secured to the front end of the rod 55.

In Figs. 8 to 11 inclusive we have shown a receptacle for receiving the side curtains 25 and 26, consisting of a wooden bottom 59 secured to metal frame members 60 having hooked ends 61 engageable with the bar 31 and extending upwardly and secured to a U-shaped top bar 62. The upper ends of the members 60 are connected by straps 60' to the bows 21 and 23. The frame, formed by the bottom 59, members 60 and bar 62, is covered with fabric 63 forming three sides of the receptacle and having a portion 63' to which the straps 60' are secured, the other side being formed by the curtain 27 and the outwardly extending portions 64 of the bar 62 bearing against this curtain. The portion 63' may be dropped down on a release of the straps 60' for removal or replacement of the curtains.

In Figs. 12 and 13 we have shown another form of receptacle having a wooden bottom 65, and end boards 66 secured together by metal bars 67 which have hooks 68 engageable with the bar 31. The front of this receptacle is formed by a siding fabric 69 secured to the bottom and provided with transversely disposed reinforcing bars 70 and 70', the fabric being secured to the end boards 66 by fasteners 71 passing through end straps 72 which are detachably connected to the bows by fasteners 73. This construction permits the front side of the receptacle being let down in storing or removing the curtains.

The front portion of the curtain 25 may be folded back over a part of its door portion, as shown in Fig. 5, and be secured thereto in this position by suitable fasteners.

It will be noted that the door portions of the curtains 25 and 26 overlap the adjacent curtains so as to form a tight enclosure, that as much window space is provided as possible, that the curtains 25 and 26 may be easily taken down and compactly stored away in the top of the vehicle and that the interior may be partly opened up when desired, all of which features are found desirable in a device of this character.

We desire it to be understood that this invention is not limited to any specific form or arrangement of parts except in so far as such limitations are specified in the claims.

What we claim as new and desire to secure by Letters Patent is:

1. In an inclosure for automobiles, the combination of a removable side curtain having a door portion, a rod secured to said door portion and detachably secured to the door of the automobile to swing the door portion of the curtain with the door, the door portion of said curtain having a longitudinally extending pocket in its upper edge with an opening adjacent the upper end of the door-rod and above the same, and a reinforcing member disposed in said pocket and removable therefrom to permit widthwise folding of the curtain.

2. In an inclosure for automobiles, the combination of a removable side curtain having a door portion, a rod secured to said door portion and detachably secured to the door of the automobile to swing the door portion of the curtain with the door, the door portion of the curtain having a longitudinally extending pocket in its upper edge with an opening adjacent the upper end of the door-rod and above the same, a reinforcing member disposed in said pocket and removable therefrom to permit widthwise folding of the curtain and a flexible connection connecting the member with the curtain without interfering with its removal from the pocket.

3. The combination of an automobile side curtain having a portion extending beneath the top provided with a ventilating opening, a frame for said opening provided with guideways, and a shutter slidable in said guideways to open or close said opening.

4. In an automobile inclosure, the combination with a curtain supporting side bar, of a side curtain carried by said bar and secured beneath the top, a frame detachably secured to said bar, releasable connections between said frame and the top bows, and covering for the sides and front of said frame cooperating with said side curtain to form a curtain receptacle.

5. In an automobile inclosure, the combination with a curtain supporting side bar, of a side curtain carried by said bar and secured beneath the top, a frame detachably secured to said bar, releasable connections between said frame and the top bows, and means cooperating with said frame and side curtain to form a curtain receptacle.

In testimony whereof, we affix our signatures, in presence of two witnesses.

GUSTAV E. HOLMES.
JOHN M. BOSTROM.
AXEL G. BOSTROM.

Witnesses:
GUSTAF ANDERSON,
WALFRID JOHNSON.